United States Patent [19]
Baldwin

[11] 3,902,297
[45] Sept. 2, 1975

[54] ADJUSTING BOLT ASSEMBLY

[75] Inventor: Samuel L. Baldwin, East Flat Rock, N.C.

[73] Assignee: General Electric Company, New York, N.Y.

[22] Filed: Dec. 13, 1973

[21] Appl. No.: 424,561

[52] U.S. Cl. ............ 52/758 F; 85/9 R; 151/69; 240/52
[51] Int. Cl. ...... F16b 1/00; F16b 7/00; F16b 23/00
[58] Field of Search ........... 85/1 R, 9 R, 9 W, 32 V, 85/36, 8.6, 8.9; 151/2, 69, 30; 285/197; 240/52 R; 52/758 F; 10/27 R; 29/525, 521

[56] References Cited
UNITED STATES PATENTS

| | | | |
|---|---|---|---|
| 2,551,834 | 5/1951 | Ferguson | 85/35 X |
| 3,362,280 | 1/1968 | Muller | 151/7 X |
| 3,430,996 | 3/1969 | Ulatowski | 85/9 R X |

FOREIGN PATENTS OR APPLICATIONS

| | | | |
|---|---|---|---|
| 524,129 | 5/1921 | France | 85/9 R |

*Primary Examiner*—Ramon S. Britts
*Attorney, Agent, or Firm*—Sidney Greenberg

[57] ABSTRACT

Bolt used for adjusting luminaire slipfitter has a fixed head at one end, a threaded portion intermediate its ends for adjustably engaging a slipfitter clamp member, and a nut at its other end having internal splines force-fitted onto the threaded end portion of the bolt.

7 Claims, 4 Drawing Figures

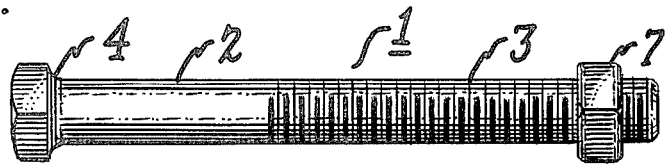
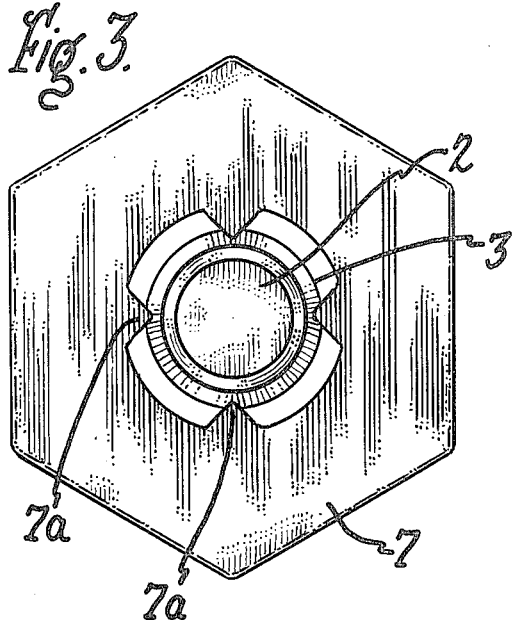
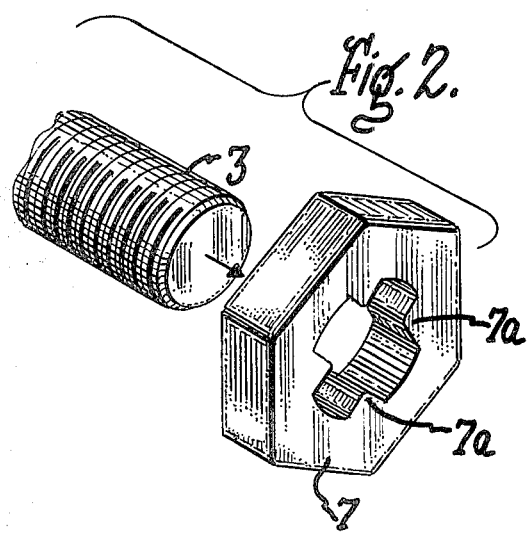
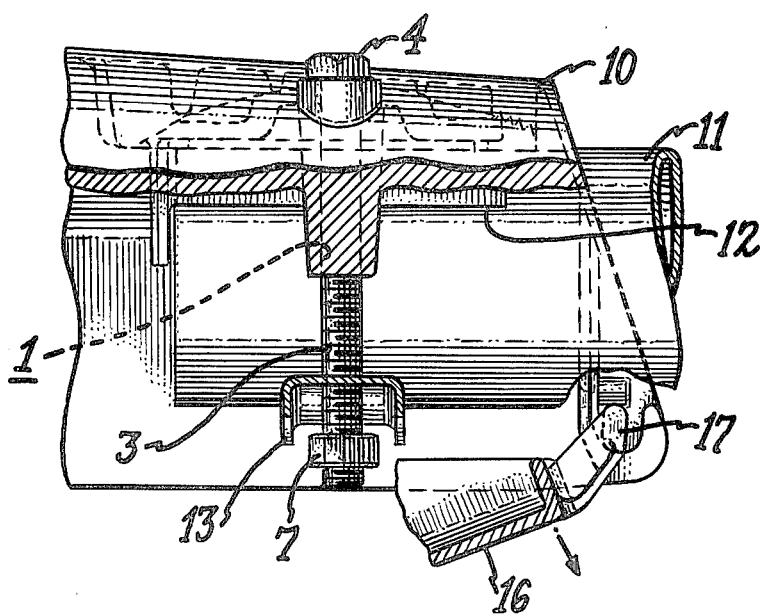

ADJUSTING BOLT ASSEMBLY

The present invention relates to an adjustable fastening device, and more particularly to an improved adjusting bolt adapted for use in a variety of applications.

It is an object of the invention to provide an adjusting bolt which is adapted for actuation at opposite ends.

It is a particular object of the invention to provide an adjusting bolt of the above type which is readily assembled on the parts to be adjusted or fastened thereby.

It is still another object of the invention to provide an adjusting bolt of the above type having fixed actuating head portions at opposite ends for alternative engagement at either end of the adjusting bolt by an appropriate tool such as a wrench for relative adjustment of parts operatively associated with the bolt.

This invention is an improvement over the adjusting bolt disclosed and claimed in the patent to Ulatowski U.S. Pat. No. 3,430,996, assigned to the same assignee as the present invention.

Other objects and advantages will become apparent from the following description and the appended claims.

With the above objects in view, the present invention in one of its aspects relates to a bolt comprising a shank having opposite ends, a first head at one end having wrenching means thereon and having a larger diameter than the shank, the shank being formed intermediate its ends with a helically threaded portion, and a polygonal second head larger in diameter than the helically threaded portion comprising a nut having an annular inner surface formed with axially directed protrusions thereon and being in force-fitted, non-rotational engagement with the helically threaded portion of the shank at the other end thereof.

The invention will be better understood from the following description and the accompanying drawing, in which:

FIG. 1 is a side elevational view of an adjusting bolt constructed in accordance with the invention;

FIG. 2 is a perspective view, in exploded form, of a portion of the adjusting bolt;

FIG. 3 is an enlarged view in elevation of the end of the adjusting bolt with the splined nut fitted thereon; and FIG. 4 is a view, partly in section, of an adjustable luminaire support structure embodying an adjusting bolt constructed in accordance with the invention.

Referring now to the drawing, and particularly to FIG. 1, there is shown an adjusting bolt having an elongated shank 2 formed with a helically threaded portion 3 and having a polygonal head 4 formed integral therewith at one end and projecting radially beyond shank 2. Nut 7, which is preferably generally similar in size and shape to head 4, has an annular interior surface formed with axially directed, circumferentially spaced splines 7a of wedge shape, as seen in FIGS. 2 and 3. The inner diameter of the splined portion of nut 7 is somewhat less than the outer (major) diameter of the threaded portion of bolt 1 so that when nut 7 is force-fitted onto the threaded end portion of bolt 1, the bolt threads are deformed by the splines which produce axial grooves therein and thereby secure nut 7 and prevent it from rotating with respect to the bolt. Nut 7 is thereby sufficiently fixed on bolt 1 to permit turning the bolt thereby with about as much torque as is applicable on integral head 4. Preferably, the inner diameter of splined nut 7 is slightly greater than the minor diameter of the bolt threads, as seen in FIG. 3, so that the nut splines need not be forced into the surface of the bolt shank at the base of the bolt threads.

FIG. 4 shown the application of bolt 1 to an adjustable clamping device such as employed in a luminaire support or slipfitter. Such a luminaire slipfitter is disclosed in greater detail in U.S. Pat. No. 3,387,866 and the aforementioned Ulatowski patent, and the disclosures thereof are incorporated by reference herein.

As shown in FIG. 4, which depicts the rear portion of the luminaire in which the slipfitter device is located, the luminaire has an upper housing 10 open at its bottom and having an opening at its rear end through which a pipe support 11 may be inserted and clamped by the slipfitter device for mounting the luminaire in operating position. Such clamping is provided by two adjusting bolts constructed in accordance with the invention (only one adjusting bolt 1 being shown in FIG. 4). The bolts extend freely through vertical passages formed in housing 10 on opposite sides of a pipe bearing member 12, the lower portion of each bolt 1 passing through a threaded aperture in a clamping yoke member 13 as shown. The upper integral head 4 engages the outer surface of the luminaire housing. Threaded portion 3 of the bolt engages the correspondingly threaded aperture in yoke member 13, with lower nut 7 which is force-fitted on the threaded portion of bolt 1 accordingly being located below yoke member 13. As will be understood, in assembling these parts, each bolt without its lower nut in place is first inserted through the passage in housing 10, its lower end is then inserted into the threaded aperture in yoke member 13, and the bolt is then rotated with the threaded portion thereof in engagement with the threaded aperture of the yoke member so that the opposite end of the bolt extends substantially below yoke member 13. Nut 7 is then force-fitted onto the threaded portion of bolt 1 by a hydraulic press or other suitable tool to nonrotatably fix the nut on the threaded bolt.

By virtue of this arrangement, yoke member 13 may be tightened or loosened on support pipe 11 by turning the outside bolt head 4 or the inside bolt head 7. In a luminaire of the type illustrated, the inside bolt head 7 is made readily accessible, even with the luminaire in mounted position, by opening bottom door 16 (see FIG. 4) so that it swings downwardly on hinge 17 at the rear end of housing 10, as more fully shown in the aforementioned patents. In this way, the slipfitter can be adjusted from below the luminaire in a position in which servicemen can see the parts to be adjusted.

If desired, the bolt heads at opposite ends of the adjusting bolts may be of different shape. For example, for purposes of safety or protection against tampering, the outside bolt heads may be of non-standard shape which fit only a specially designed tool, whereas the inside bolt heads may be of hexagonal form operated by standard socket or wrench tools.

The present invention is an improvement over the structure shown in the aforementioned Ulatowski patent in that bolt 1 may be of readily available standard type and dispenses with the need for the longitudinal splines and the unthreaded non-splined end portion which characterized the Ulatowski bolt. The present arrangement is such that the internally splined nut 7 may be readily force-fitted on the bottom end of bolt 1 simply by placing nut 7 at the bottom end of the bolt and tapping it into place on the threaded end portion of bolt 1 by a hammer or the like. By virtue of the splines 7a cutting into the threads of bolt 1 as shown in FIG. 3, the nut is held in fixed nonrotational position on the bolt.

While the invention has been described particularly in connection with a luminaire slipfitter, it will be evident that it may have application in a number of other devices. In general, the adjusting bolt device is useful for adjusting or clamping a movable part from opposite sides, especially from opposite sides of a barrier or wall, where such alternative operation is desirable for any reason. Accordingly, it will be understood that numerous modifications and variations from the particular embodiment shown may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A bolt comprising a shank having opposite ends, a first heat at one end having wrenching means thereon and having a larger diameter than said shank, said shank being formed intermediate its ends with a helically threaded portion, and a polygonal second head larger in diameter than said helically threaded portion comprising a threadless nut having an annular inner surface formed with circumferentially spaced axially directed protrusions thereon defining a transverse dimension therebetween less than the major diameter of said helically threaded portion of said shank, said nut being in axially force-fitted, non-rotational engagement with said helically threaded portion of said shank at the other end thereof, said helically threaded shank portion being axially deformed by said nut force-fitted thereon.

2. A device as defined in claim 1, said axially directed protrusions comprising a plurality of circumferentially spaced, substantially wedge-shaped splines.

3. A device as defined in claim 2, said helically threaded portion of said shank extending substantially to said other end thereof.

4. A device as defined in claim 2, the inner diameter of said splined nut being slightly larger than the minor diameter of said bolt threads.

5. A device as defined in claim 1, wherein an adjustable member threadeadly engages said helically threaded portion of said bolt shank, whereby the adjustable member may be moved along said shank by actuating the head at either end of the bolt.

6. A device as defined in claim 5, further comprising a stationary member through which said shank freely passes with said first head on one side of said stationary member, and said adjustable member and said second head on the other side of said stationary member, whereby said adjustable member may be moved along said shank toward and away from said stationary member by actuating the head at either end of the bolt.

7. In a luminaire, a housing having an open end for receiving an elongated support member on which the luminaire is adapted to be mounted, bearing means on said housing for engaging one side of the support member, movable clamp means in said housing for engaging the opposite side of the support member, and adjusting bolt means for adjusting said clamp means toward and away from said bearing means for releasably clamping the elongated support member, said adjusting bolt means comprising a shank having opposite ends and passing freely through said housing adjacent said bearing means, a first head at one end of said shank having wrenching means thereon and engaging one side of said housing, said shank being formed intermediate its ends with a helically threaded portion threadably engaging said movable clamp means on the other side of said housing, and a polygonal second head comprising a threadless nut having an inner surface formed with circumferentially spaced splines defining a transverse dimension therebetween less than the major diameter of said helically threaded portion of said shank and being force-fitted on the helically threaded portion at the other end of said shank, said helically threaded shank portion being axially deformed by said nut force-fitted thereon, whereby said adjusting bolt may be actuated at either end and on opposite sides of said housing for moving said clamp means toward and away from said bearing means.

* * * * *